J. LÜBER.
MACHINE FOR AUTOMATIC INSERTION AND THREADING OF BOBBINS.
APPLICATION FILED SEPT. 6, 1907.

987,472.

Patented Mar. 21, 1911.

8 SHEETS—SHEET 1.

Witnesses:
Mabel V. Goldsmith
George John Stevens

Inventor:
Jakob Lüber
By William E. Richards
His Attorney

J. LÜBER.
MACHINE FOR AUTOMATIC INSERTION AND THREADING OF BOBBINS.
APPLICATION FILED SEPT. 6, 1907.
987,472.
Patented Mar. 21, 1911.
8 SHEETS—SHEET 2.
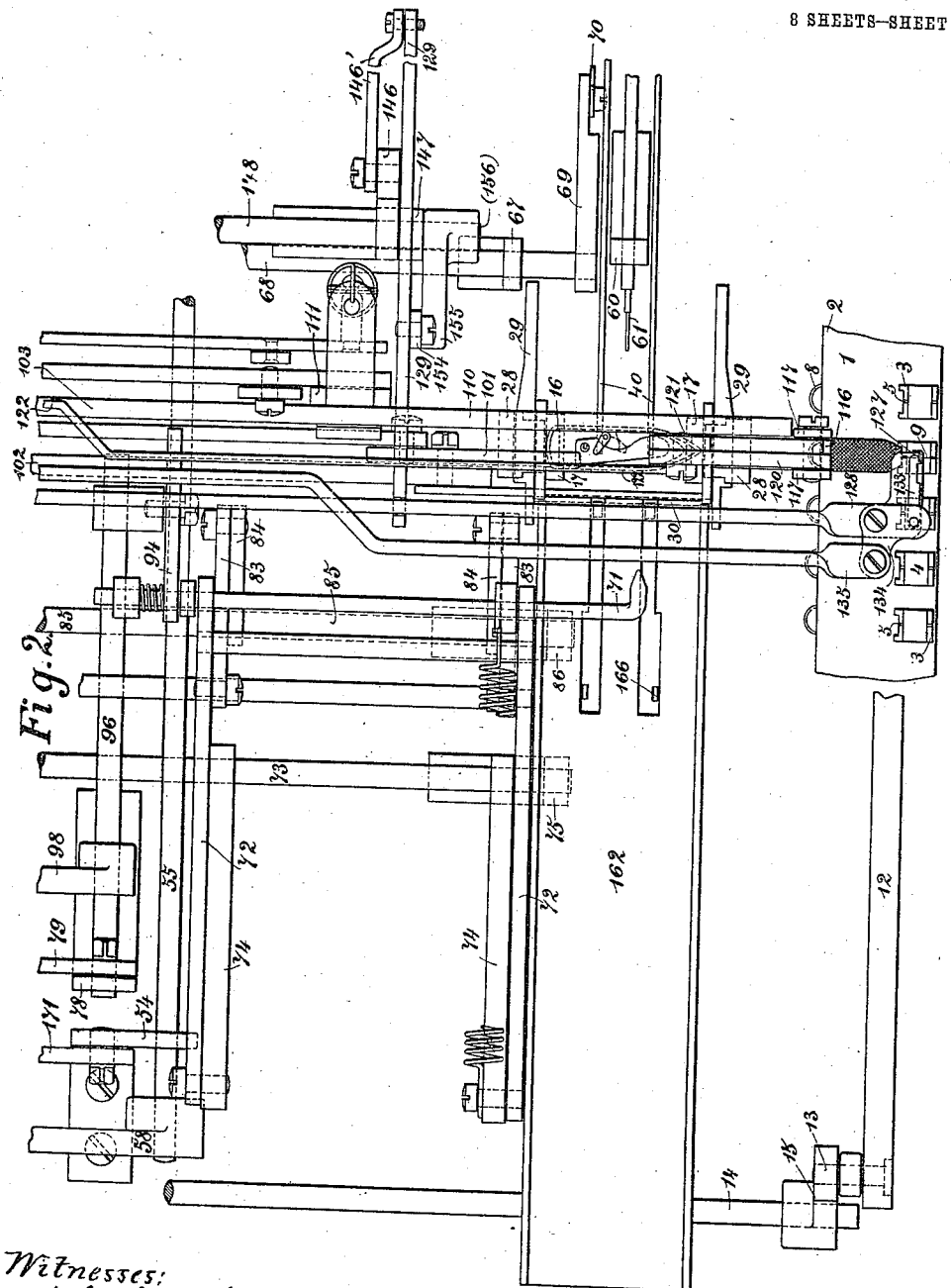

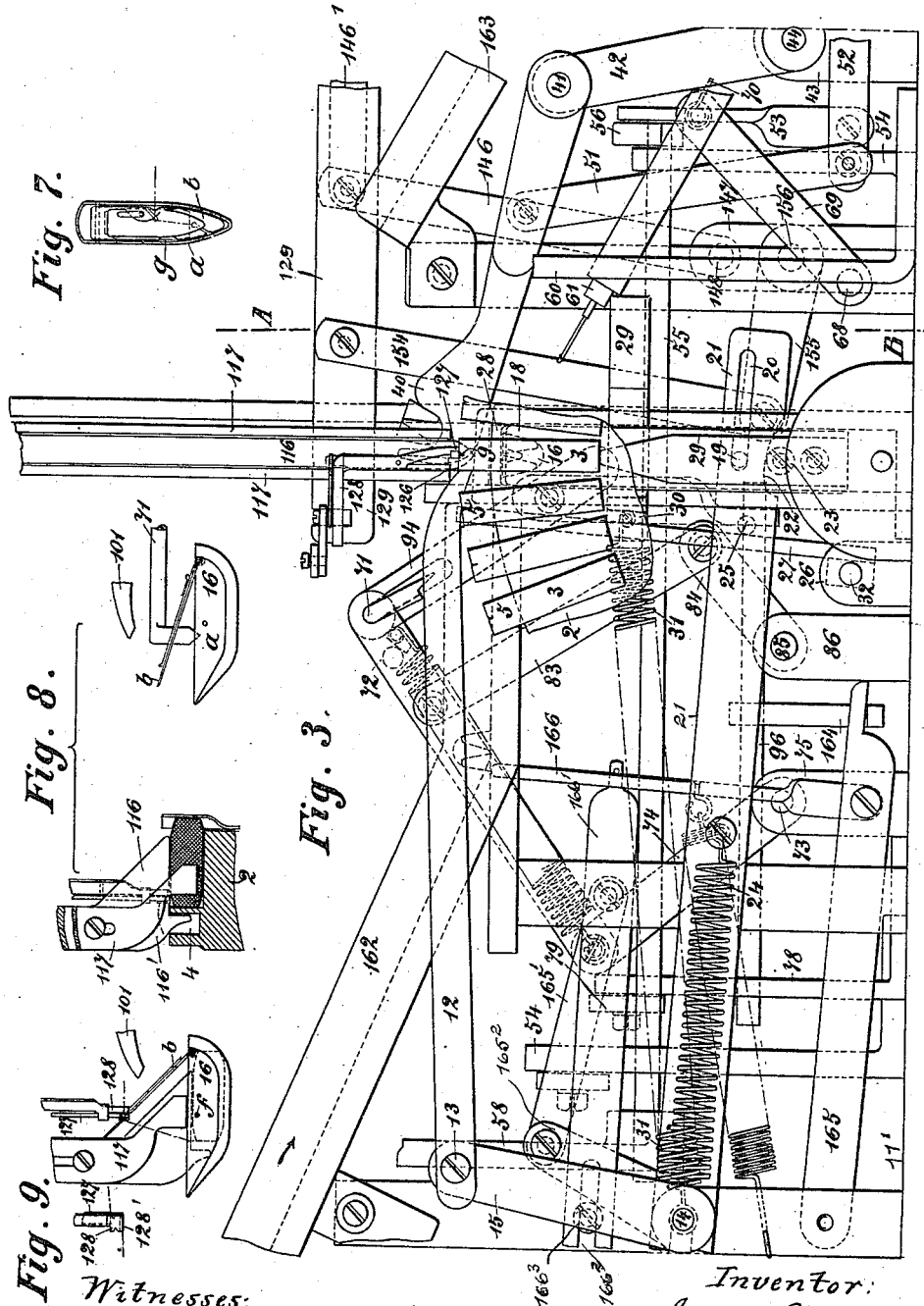

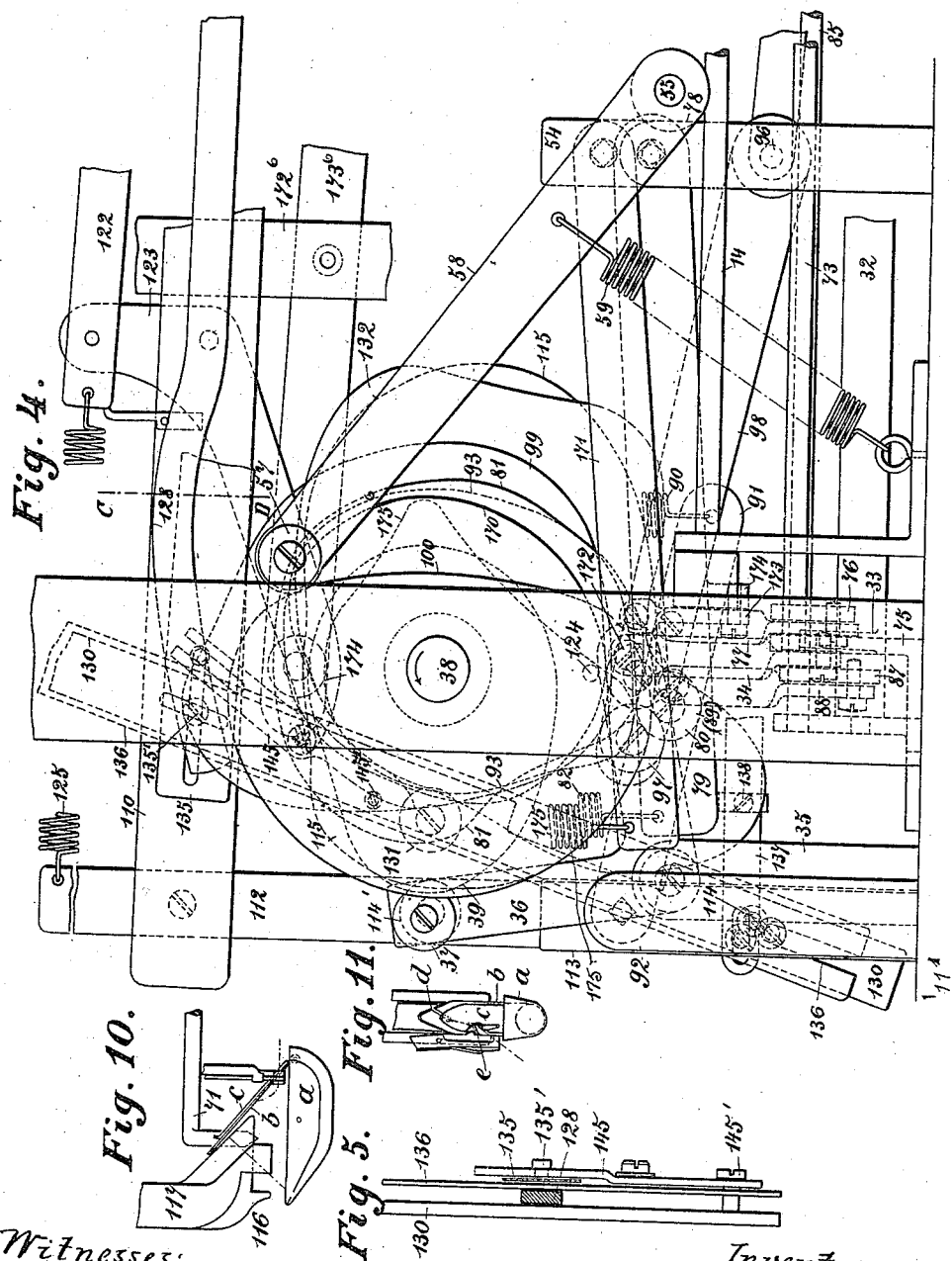

J. LÜBER.
MACHINE FOR AUTOMATIC INSERTION AND THREADING OF BOBBINS.
APPLICATION FILED SEPT. 6, 1907.
987,472.
Patented Mar. 21, 1911.
8 SHEETS—SHEET 5.
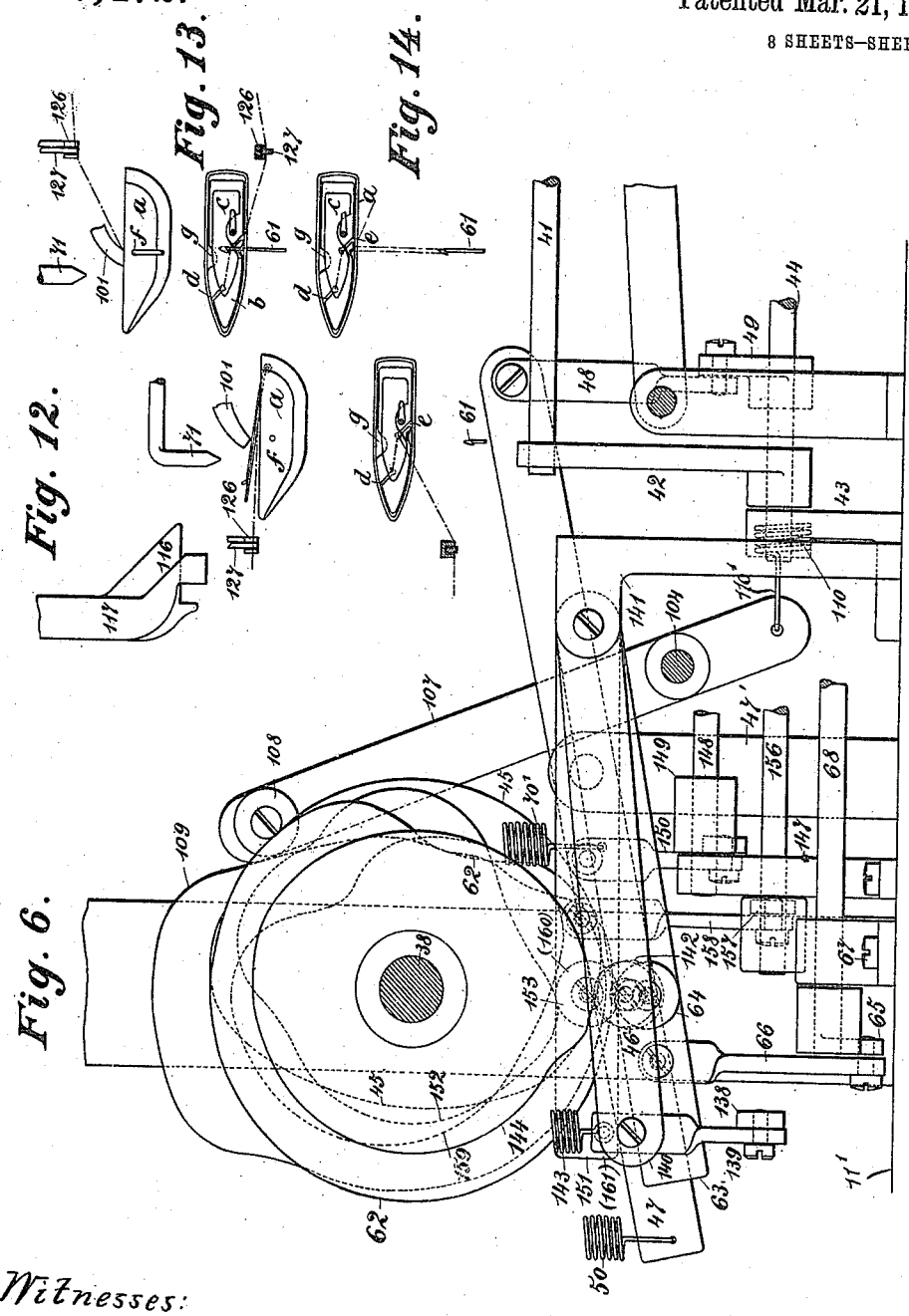

J. LÜBER.
MACHINE FOR AUTOMATIC INSERTION AND THREADING OF BOBBINS.
APPLICATION FILED SEPT. 6, 1907.
987,472.
Patented Mar. 21, 1911.
8 SHEETS—SHEET 6.
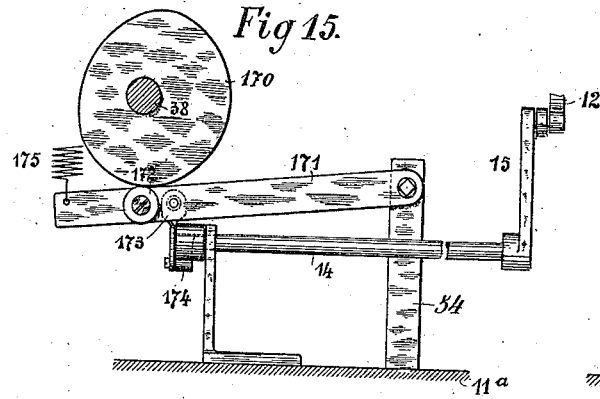
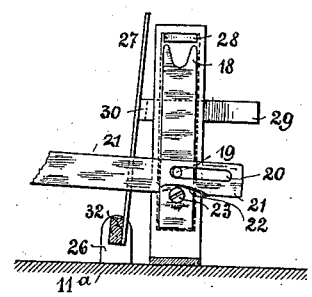
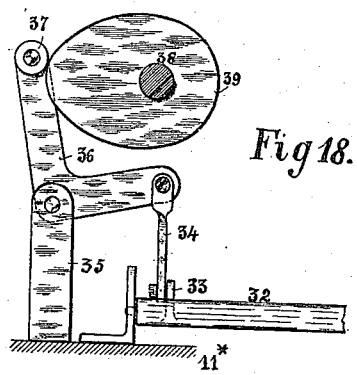
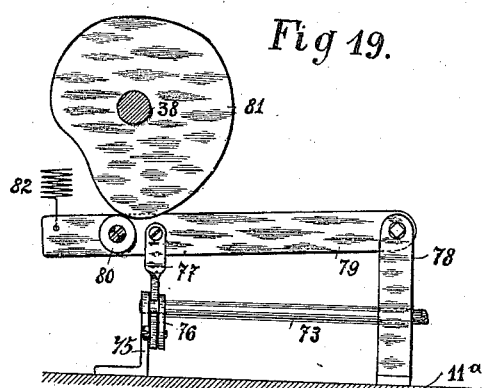
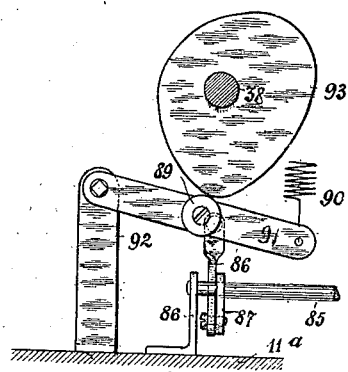

J. LÜBER.
MACHINE FOR AUTOMATIC INSERTION AND THREADING OF BOBBINS.
APPLICATION FILED SEPT. 6, 1907.
987,472.
Patented Mar. 21, 1911.
8 SHEETS—SHEET 7.
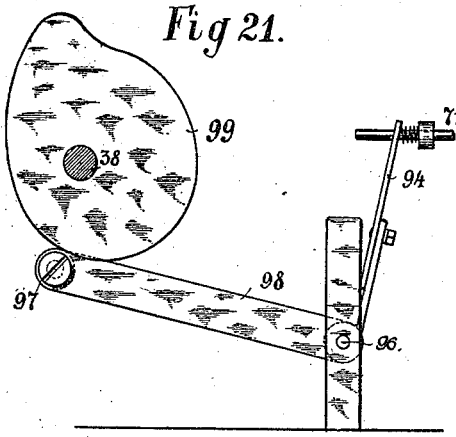
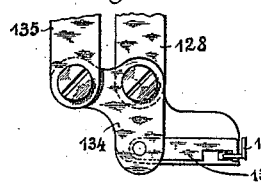
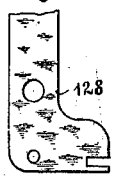
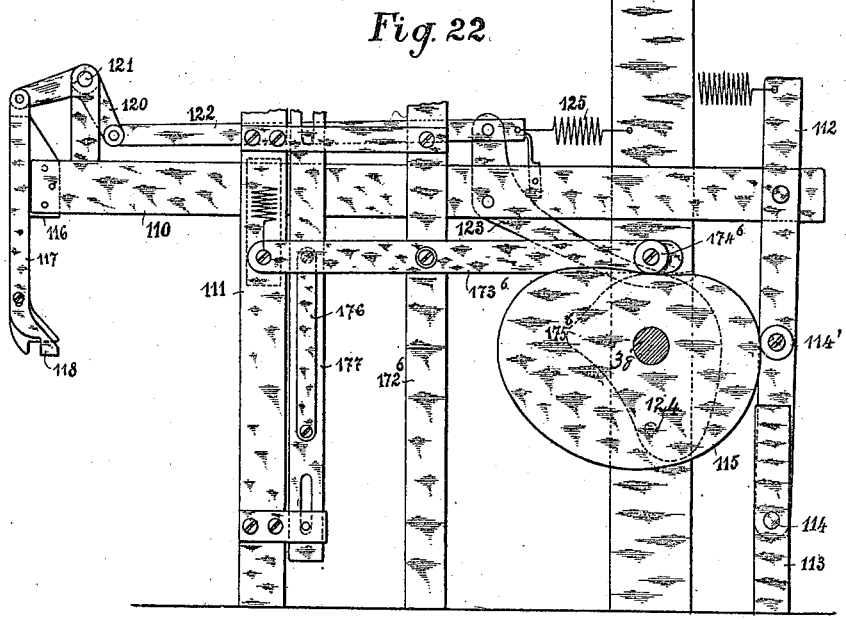

J. LÜBER.
MACHINE FOR AUTOMATIC INSERTION AND THREADING OF BOBBINS.
APPLICATION FILED SEPT. 6, 1907.

987,472.

Patented Mar. 21, 1911.

8 SHEETS—SHEET 8.

Witnesses
W. Max. Duvall
Jas. E. Dodge

Inventor:
Jacob Lüber by
Wilkinson Fisher &
Wilkinson
Attorneys.

UNITED STATES PATENT OFFICE.

JAKOB LÜBER, OF HEERBRUGG, ST. GALLEN, SWITZERLAND.

MACHINE FOR AUTOMATIC INSERTION AND THREADING OF BOBBINS.

987,472. Specification of Letters Patent. Patented Mar. 21, 1911.

Application filed September 6, 1907. Serial No. 391,617.

*To all whom it may concern:*

Be it known that I, JAKOB LÜBER, a citizen of the Republic of Switzerland, and residing at Heerbrugg, St. Gallen, Switzerland, have invented a certain new and useful Machine for Automatic Insertion and Threading of Bobbins, of which I do hereby declare the following to be a full, clear, and exact specification.

This invention relates to a machine for mechanically inserting bobbins into shuttles and more particularly for inserting bobbins into the shuttles used in embroidering machines in such manner that such shuttles when they leave the machine are ready for insertion again into the shuttle carrier of said embroidering machines.

The invention consists, in a mechanism for feeding automatically and periodically empty, closed shuttles to a suitable fixed shuttle holder, and in mechanisms for opening the shuttle, inserting a bobbin, closing said shuttle, drawing the end of the bobbin thread under the tension spring on the shuttle cover, threading said end through the thread opening in the shuttle wall, and ejecting said shuttle from its holder, said mechanism being organized to repeat the described operation indefinitely.

The invention further consists in the details of construction and in the combination and arrangement of parts more particularly hereinafter described and pointed out in the claims.

Figure 1:
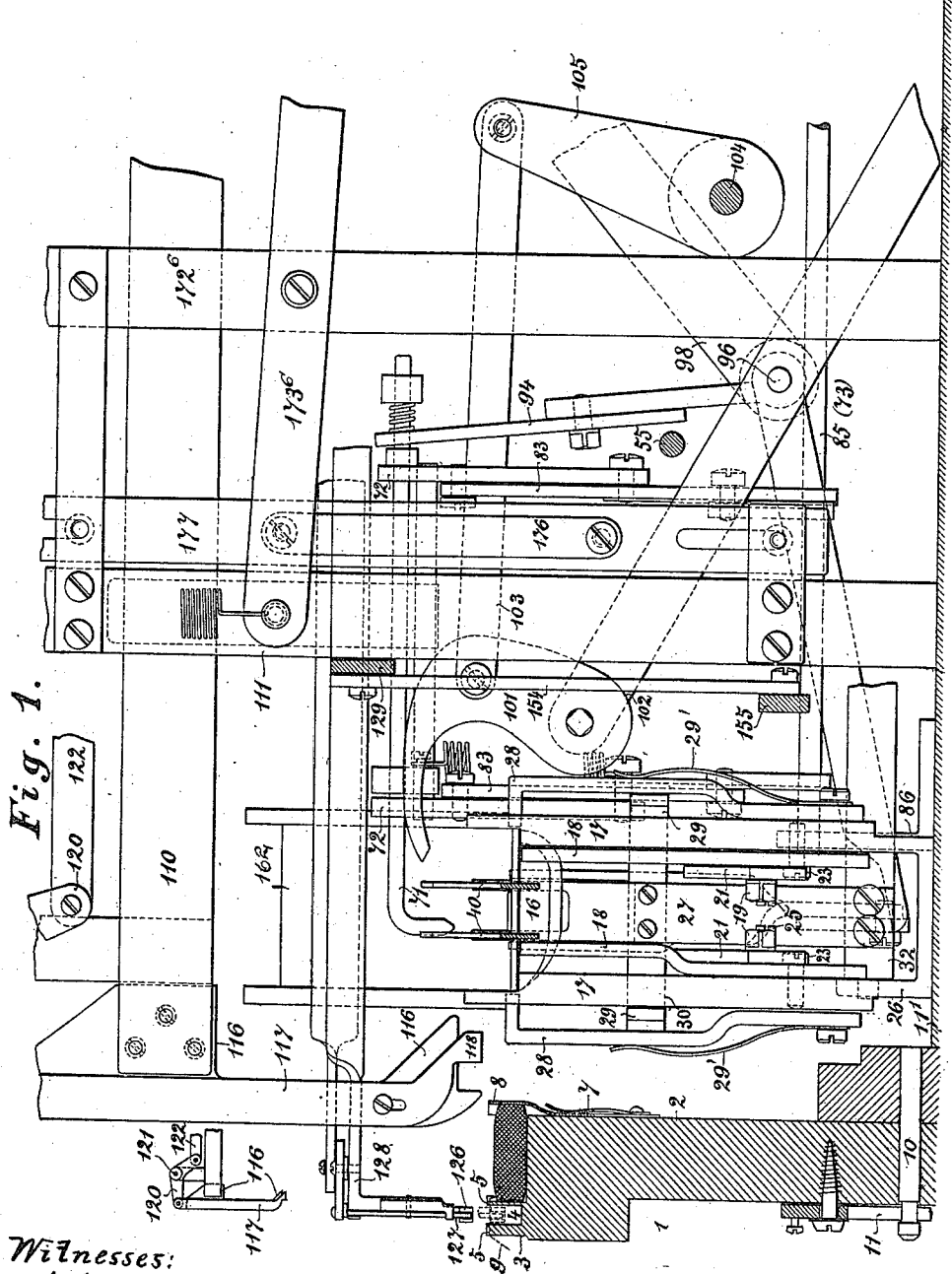

Referring to the accompanying drawings forming a part of this specification in which like characters of reference denote corresponding parts in all views:—Figure 1 is a vertical section of a machine embodying my invention taken on the line A—B of Fig. 3, and viewed from right to left. Fig. 2, represents a plan view, parts being broken away. Fig. 3, a front elevation of the part illustrated in Figs. 1 and 2. Fig. 4, a side elevation of the part adjoining that shown in Fig. 1 on the right. Fig. 5, a section of a detail taken on the line C—D of Fig. 4. Fig. 6, a side elevation of the parts of the machine lying behind the parts shown in Fig. 4. Fig. 7, a plan view of a standard shuttle detached, with inserted and double threaded bobbins. Fig. 8, a detail view, showing the gripper for transporting the bobbin to the shuttle, and also a shuttle with the shuttle-opener and shuttle-closer shown in operative position with relation thereto. Fig. 9, a detail view showing the relative position of certain parts upon the delivery of the bobbin to the shuttle. Fig. 10, a detail view showing the lowermost position of the thread tongs after delivery of the bobbin to the shuttle. Fig. 11, a detail view looking down on a closed shuttle in the holder. Fig. 12, a detail view illustrating the threading of the shuttle with a relative position of the shuttle-opener and shuttle-closer at this time. Figs. 13 and 14 detail views showing the method of drawing the end of the bobbin through the eye of the shuttle. Fig. 15, a detail view showing mechanism for actuating the shuttle-carrier or shield. Figs. 16 and 17, detail views of mechanism for raising the shuttle from its seat after the bobbin has been inserted. Fig. 18, a detail view illustrative in part of mechanism for preventing the shuttle from involuntarily leaving its seat during the operation of feeding a bobbin therein. Figs. 19, 20 and 21, detail views illustrative in part of mechanism for opening a shuttle after same has been fed to holder. Figs. 22, 23, 24 and 25, detail views illustrative of mechanism for transporting a bobbin from the carrier and delivering the same into a shuttle in its holder. Fig. 26, is a diagrammatic view showing in plan certain parts of Fig. 25 that are not seen in the other figures.

Referring to Fig. 1, the mechanism for feeding a bobbin into the shuttle holder comprises the following parts:—A sheave 2 is pivotally mounted on the frame 11' by a pin 10, and displacement therefrom is prevented by a slide 11 which has one end fixed to the sheave, as shown. Secured to the outer face of the sheave, and extending beyond the periphery thereof, are a series of blocks 3, Figs. 1 and 3. The extending outer ends of said blocks are provided with corresponding grooves 4, and the walls of said grooves are each provided at their upper edges with corresponding notches 5. On the inner face of the sheave 2, and corresponding to the blocks 3, are secured clamps 8 controlled by springs 7. The bobbins are each inserted and carried on the periphery of the said sheave between one of the clamps 8, and the inner face of the projecting outer end of a block 3; the thread end 9 of the bobbin being secured in one of the notches. The requisite motion for successively presenting the bobbins for feeding is imparted to sheave 2, see Figs. 1, 2, 3 and 15, through the agency of link or pawl 12, which has one end secured to the arm 15 by a pin 13, said arm 15 being in turn secured to shaft 14. This shaft 14 is shown as broken away in Fig. 2, opposite the support 54, but in Fig. 15, it is shown as extending beyond said support, and to be actuated by means of the cam 170. This cam is carried by the shaft 38, contacts with the roller 172 carried by the arm 171, which is connected by the link 173 to the arm 174 which rocks the shaft 14. The shaft 14 in turn oscillates the arm 15, Figs. 2 and 3, which reciprocates the pawl 12 that controls the sheave 2, as above stated. One end of arm 171 is pivoted on the support 54, while spring 175 is secured to the other end and serves to keep the roller 172 in constant touch with cam 170.

Referring to Figs. 2 and 3, the mechanism for feeding an empty shuttle to the position ready to receive a bobbin, comprises the following parts:—An upwardly inclined shuttle feed trough 162 is provided, in which the shuttles are placed with their longitudinal axes transversely of the trough and with their covers closed down, the width of the trough being such as to allow the shuttles therein to slide freely toward the delivery end. Inasmuch as one shuttle 16 after another is to be supplied with a bobbin, it must necessarily follow that said shuttles must be fed one at a time from the trough to the shuttle holder (to be hereinafter described). This is accomplished through the agency of the crotch bar 166, Figs. 2 and 3, which has its fingers projecting through the bottom of trough 162 so as to engage the shuttle therein, nearest the shuttle holder, and to the left, as seen in Fig. 2, of the longitudinal axis of said shuttle. An upward movement imparted to the crotch bar 166 shifts the shuttle in to engagement therewith, when it will occupy the position represented in dotted lines in Fig. 3. It will thus be obvious that if an upward movement should be imparted to crotch bar 166, the shuttle in engagement therewith will be shifted so that it will lie on its side with its curved back portion pointing in the direction of the delivery end of the shuttle trough 162. Crotch bar 166, has its lower end pivoted to link 165′, which in turn is pivoted to the frame. Another link 166′ has one end connected to said bar 166, slightly above the center of the latter, and its other end secured to the frame through the medium of slot 166² which is penetrated by a pin 166³, whereby said link 166′ is free to move back and forth on and rotate around said pin. A link 165 has one end pivoted to link 166′, and its other end pivoted to an arm 165² mounted on shaft 14. Said shaft being adapted to rock or oscillate, as above described, it follows that the requisite movement of bar 166 is had to shift a shuttle into a position to be fed into the holder; further movement of said shuttle to deposit it in the shuttle holder after the same has been shifted by crotch bar 166, is effected by arm 27, pivoted to bearing 26. This arm also penetrating the trough 162, and is adapted to force the shuttle over the delivery end of said trough into the shuttle holder by its forward oscillation, which is accomplished in a suitable manner, as will be more fully described hereinafter.

The mechanism for opening a shuttle 16 after the same has been deposited in the holder, comprises the arm 71 (Figs. 1, 2, 3 and 19) provided with an angular pointed end. Said arm is supported by rails 72 and is adjustable thereon, the left hand ends of said rails, as seen in Fig. 3, being downwardly inclined and connected to arms 74, which are in turn secured on shaft 73. Shaft 73, works in bearings 75, carries at its rear, arm 76, Fig. 19, the end of which is connected by means of link 77 to arm 79 resting on support 78; this arm carries roller 80, contacting with cam 81 carried on shaft 38. The ascending parts of the cam will consequently cause the shuttle-opener 71 to be displaced to the left and downward in a slanting direction and vice versa. Spring 82 controlling arm 79, keeps roller 80 in contact with cam 81. Rod 83 (Figs. 1 to 3) contacts with each rail 72; the bottom end of this rod being connected to arms 84 secured on shaft 85, which rests in bearings 86 and carries at its rear end arm 87 (Figs. 4 and 20), which by means of link 86 is connected to arm 91 carrying roller 89 and controlled by the tension of spring 90; this arm 91 pivots on support 92. The ascending parts of cam 93, with which roller 89 forms contact, will thus displace the shuttle-opener from right to left and upward. In order to impart to the shuttle-opener a horizontal longitudinal displacement, two part arm 94 (Figs. 1, 2, 3, and 21) provided with a slit, catches on the rear end of the shuttle-opener 71. This arm is secured on shaft 96 resting in bearing 78 and traverse 102. Shaft 96 carries at its left end as seen in Fig. 2, the arm 98, provided with the roller 97, see Fig. 4, which contacts with cam 99 on shaft 38. During the rotation of shaft 38, the ascending parts of the cam will, through the connections described, cause the shuttle-opener to be displaced in one direction, while the descending parts will cause its displacement in an opposite direction.

Coming now to the mechanism for transporting the bobbin from its position above described on the sheave 2, to the shuttle in the holder, the same comprises a rail 110, Figs. 1, 2 and 22, arranged so as to be movable on its support 111, while it is also pivoted to arm 112, which is in turn pivoted at 114 on support 113, carried on the base of the frame. Arm 112 carries roller 114', which works in conjunction with cam 115 on shaft 38. Now we must conceive arm 112 as being pressed by the spring, as shown, toward the cam. Rail 110 carries in front central piece 116, on both sides of which are the sliding rails 117, having their feet 118 bent backward so as to be adjustable. These sliding rails 117 are pivoted to one arm of a bell crank lever 120, which at 121 is pivoted to a projection of the rail 110; the other arm of lever 120 is pivoted to rod 122, whose rear end is pivoted to the short arm of bell crank 123, which in turn is pivoted to rail 110. The long arm of this lever 123 is placed in the path of pin 124 carried on cam 115, mounted on the shaft 38. This pin by knocking against the long arm of the lever 123 causes the sliding rails 117 to ascend; while spring 125 tends to push rod 122 backward. In order to raise the bobbin-transporting device, lever 173$^6$ is provided on support 172$^6$, the rear end of this lever carrying roller 174$^6$ resting on cam 175$^6$. The front end of lever 173$^6$ is connected by means of link 176 to the sliding bar 177, this bar being connected at the top to rail 110. During the rotation of shaft 38 the ascending parts of cam 175$^6$ will cause the transporting device to descend while the descending parts cause it to ascend.

Figure 25:
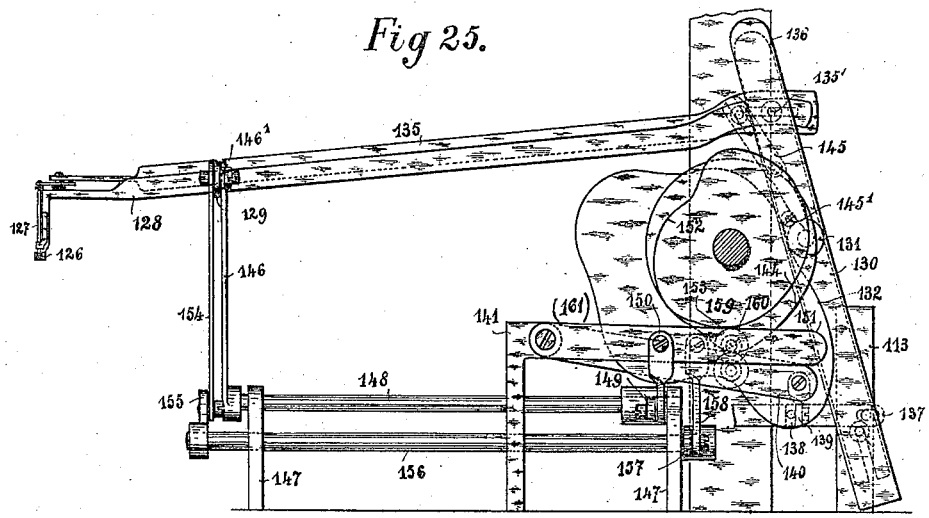
Figure 26:
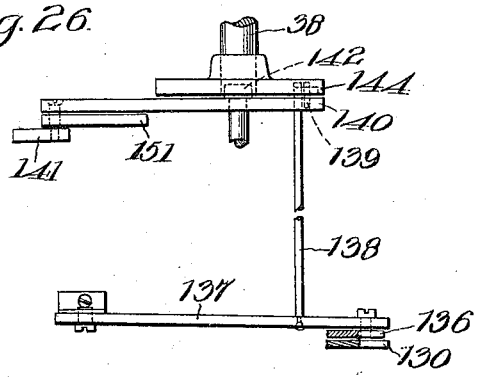

Referring back to Figs. 1 to 3, in order to secure the end of the bobbin during its movement from the sheave 2, to the shuttle, a pair of tongs is provided, consisting of a fast cheek 126 and a loose cheek 127, see also Fig. 25. Fast cheek 126, is bent downward and forms the end of rod 128, which rests in a slit of rail 129, while it is jointed at its rear to the top part of arm 130 (Figs. 5 and 25). This arm is pivoted to the support 113, and carries roller 131, contacting with cam 132. We must conceive this arm 130 as being drawn by a spring, not shown, toward cam 132. The ascending parts of the cam 132 will cause rod 128 to recede, while the descending parts will cause this rod to advance. Loose cheek 127 rests at its top end in hook 133, Fig. 2; and this hook is arranged at one end of bell crank lever 134 carried on rod 128. Rod 135 is connected to the other end of the bell crank lever 134, and the rear end (which is slit) see Figs. 4 to 25, of this rod rests on pin 135' of arm 130; pin 135' serving at the same time for guiding rod 136 (see Figs. 4, 5 and 26,) which is adjustable on arm 130. Arm 137, Figs. 4 and 26, pivots at the bottom end of rod 136 (this pivot is not shown in Fig. 4), and arm 138 pivots on arm 137 at right angles thereto (Fig. 26) and is in turn pivotally connected by link 139 (Figs. 25 and 26) to arm 140. The latter is pivoted to the support 141 and carries the roller 142 (Figs. 6, 25 and 26) which is pressed by the tension of spring 143 against the cam 144.

To arm 130 is pivoted lever 145 (Figs. 4, 5, and 25), and its top end, which is forked, grasps a pin secured to rod 135, Fig. 25. The bottom end of the lever 145 is curved and forms contact with pin 145' fixed to rod 136. When arm 140 is pressed downward by cam 144, the free end of arm 138 and that of arm 137 will also go down, which results in rod 136 with lever 145 being pulled downward. While rod 136 slides downward, pin 145' slides on the curving surface of lever 145 and causes this lever to turn in a direction opposite to that of the hand of a watch, whereby rod 135 is pushed to the rear and the tongs opened; when arm 140 approaches the center of the cam the tongs will close.

To rail 129, Figs. 1, 2 and 3, is pivotally connected by means of link 146' an arm 146, which arm is secured on shaft 148, see Figs. 1, 2 and 3, and shaft 148 works in bearings 147, Fig. 25. Shaft 148 also carries arm 149, Fig. 6, which by means of link 150, Fig. 25, is connected to lever 151 pivoted to support 141; and lever 151 carries roller 153 making contact with cam 152 on shaft 38. The ascending parts of cam 152 will, consequently, through the connections described, cause the tongs to be displaced to the right and the descending parts to the left.

For the purpose of vertically reciprocating rod 128, rail 129 is connected (Figs. 1, 3 and 25) by means of rod 154 to lever 155, this lever being secured on shaft 156 resting in bearings 147. Shaft 156 carries at its other end arm 157 (Figs. 6 and 25) which by means of link 158 is connected to arm 161 pivoted to support 141. Arm 161 carries roller 160 forming contact with cam 159. The ascending parts of the cam will cause rail 129 with rod 128 to go up; while the descending parts will cause it to go down. The transporting mechanism thus described serves to deposit the bobbin in the shuttle and to partially thread the shuttle, as will appear more fully below.

The complete threading of the shuttle 16 is accomplished by hook 61 carried in supports 60 and adjustable thereon (Figs. 2 and 3) catching the end of the bobbin thread and drawing it through the opening of the shuttle. This hook is actuated from cam 62 (Fig. 6) by means of roller 64 secured on arm 63, link 66 connecting arm 63 to arm 65, shaft 68 working in bearings 67, arm 69 secured on this shaft and rod 70 (Fig. 3) connecting said arm 69 to hook 61. Spring 70$^1$ keeps the roller in constant touch with the cam (Fig. 6).

The mechanism for closing the shuttle after a bobbin has been inserted therein comprises a hook-shaped shuttle-closer 101 (Fig. 1) pivoting around a transverse bar 102 of the frame, and connected by means of link 103 to arm 105 secured on shaft 104. Shaft 104, whose bearings are not shown in the drawing, carries at its other end arm 107 having roller 108 (Fig. 6), and the latter forms contact with cam 109 secured on shaft 38. Thus it will be obvious that on rotating shaft 38 the ascending parts of the cam will cause the shuttle closer to descend and the descending parts will cause the shuttle closer 101 to recede from the shuttle. The spring 110', Fig. 6, tends to press arm 107 against cam 109.

The operation of the mechanism by which a bobbin is inserted in a shuttle and the shuttle threaded may be briefly given as follows:—Assuming that an empty shuttle rests in the shuttle holder, a number of bobbins being fixed on sheave 2, (Figs. 1 and 2), and that the tongs 126, 127 are opened above the end of the bobbin; on turning the main shaft 38, rod 128 is lowered, whereby the two open cheeks of the tongs enter groove 4, and grasp the end of the bobbin. They then close and perform a movement to the left until the two cheeks enter the next gap between two blocks 3. During this time the bobbin transporter also performs a movement, which at first is directed to the front and thereafter downward, so that the remote part of the central piece 116, is placed above the bobbin to be inserted in the shuttle, while projection 116' of central piece 116 enters groove 4, the bobbin in the meantime being strongly held between the two feet of the rail ends (Fig. 8). By the time the central piece arrives in this position, the tongs which still remain closed will have commenced moving slantingly upward and backward, carrying the end of the bobbin with them in this movement. While this has been going on, shuttle-opener 71 has moved to the right and downward. The positions of the various parts are so arranged that the point of the shuttle opener 71 is pushed through recess g in shuttle-cover b between side a of the shuttle and its cover b for the purpose of forcing this cover open, see Fig. 8. By further turning the main shaft 38, we cause, with the assistance of the intermediate parts already referred to, the transporter first to ascend and then to be displaced backward. At the same time backward movements are performed by the tongs and the shuttle opener; cover b of the shuttle being opened by the latter. The positions of the various parts are arranged in such a way that on the transporter reaching its extreme rear position the bobbin happens to be in the open shuttle; rails 117, Fig. 1, are being displaced upward so that the bobbin can freely drop into the shuttle, while the shuttle opener has already left the shuttle and moved to the left. The tongs with the end of the bobbin find themselves to the right of the transporter and approximately on a level with the free end of shuttle-cover b (Fig. 9). While the tongs are in this position, the thread rests in cross-slit 128' of the tongs, Fig. 9. On further turning, the tongs perform a slanting backward movement in the direction from left to right as seen in Fig. 9 whereby the thread carried along by them is drawn into slit d, Figs. 12, 13 and 14, provided in the edge of shuttle-cover b, and thence between shuttle-cover b and shuttle spring c arranged above it. Fig. 10 shows a front elevation of the parts in question at the lowest position of the tongs, while Fig. 11 illustrates the same parts, viewed from behind. On further turning the main shaft 38, the tongs perform a rapid movement to the front, their position remaining to the right of the bobbin transporter, the thread being thereby drawn into slit e (Fig. 12) provided in the other edge of the shuttle cover; at the same time the shuttle shutter is moved forward and this shuts shuttle-cover b. On the thread being inserted in the slits mentioned, it constantly rests in cross slit 128', being thus always maintained in its proper position. So far hook 61 has remained in the position shown in Figs. 2, 3 and 12, but after the tongs have reached the position shown in Fig. 12, this hook is so timed that it advances and passes through the slanting hole f of the shuttle. The tongs now perform another movement to the rear, still remaining on the right side of the bobbin transporter, and place the thread on the shank of hook 61 (Fig. 13). After this has been done, the hook is again drawn back, whereby the end of the thread is drawn through hole f (Fig. 14), whereupon the tongs open and release the thread, and the shuttle closer enters into its position of rest.

The mechanism for ejecting the shuttle from the holder after insertion and threading, comprises the ejector arm 40 (Figs. 1 to 3) pivoted on shaft 41 which is carried by arms 42; said arms are arranged on shaft 44 supported in bearings 43; this shaft is started from cam 45, secured on main shaft 38, by means of lever 47, (Fig. 6) carrying sliding roll 46, joint-rod 48 and arm 49 on shaft 44. Spring 50 pushes lever 47 against cam 45; the descending parts of the latter thus cause shaft 44 to turn in the direction of the hand of a watch and the throwing out device of the shuttle to be displaced to the right in Fig. 3. Lever 47 pivots around support 47'. In order to impart to the throwing out device of the shuttle, in addition to its right and left motion, an up and down motion, rod 51 extends from this throwing out device to the arm 52 (Fig. 3), the pivot of this arm not being visible in the drawing. Arm 52 is connected by means of rod 53 to arm 56, carried on shaft 55 supported in bearings 54. Shaft 55 carries in addition arm 58 (Figs. 3 and 4) provided with sliding roll 57, this arm being pushed by spring 59 against cam 100 secured on main shaft 38. While the cam rotates, its ascending parts cause the throwing out device of the shuttle to descend and its descending parts cause this device to ascend.

The throwing out device 40 of the shuttle places the threaded shuttle on a delivery board 163. The positions of the various parts are arranged in such a way that immediately after throwing out the filled shuttle an empty shuttle is placed from the inlet board 162 in the shuttle bearing (while the throwing out device recedes, it passes from beneath under the fresh shuttle resting in the shuttle bearing) and after removing a bobbin from sheave 2 it is by means of pawl 12, moved forward the distance of two blocks, whereupon the same process takes place again. As the thread is passed through the two slits $d$ and $e$ of the shuttle cover, it is double threaded.

With the parts of the machine in the positions shown on the drawings, a shuttle 16, see Fig. 2, rests in its bearings 17, constituting a fixed shuttle holder Figs. 1, 2, 3, 16 and 17, which are supported from the frame 11'. In order to raise the shuttle 16 from its seat, two slides 18 are provided, carrying pins 19 extending through slots 20 in arms or rails 21, the left hand ends of which, as seen in Fig. 3, are provided with slots and fit over the shaft 14. Each of these arms 21 at the other end is provided with a cam recess 22, Figs. 3 and 16, resting on a pin 23, carried by the shuttle supports. It follows from this construction that if the arms 21 are given a longitudinal motion to the left, as seen in Fig. 3, their ends will rise and carry the pins 19 and slides 18 with them, thereby causing the shuttle 16 to be lifted from its seat. Each arm 21 is provided with a spring 24 tending to move it to the left, and with a pin 25 adapted to be struck by the arm 27 and to be thereby moved to the right. The arm 27 is secured to rod 32, is pivoted in bearings 26, and by turning the same in the direction of the hands of a watch, as seen in Fig. 3, the slides 18 are lowered, while by turning said arm in the opposite direction the slides will be raised. In order to prevent the shuttle from leaving its seat, the shuttle bearing is provided at the rear and in front with two clasps 28, being at their tops bent inward and by means of flat springs 29' pressed inward. In order to move these clasps toward each other and again away from each other, two wedges 29 are provided, each wedge extending between a clasp and part of the side of shuttle bearing or fixed shuttle holder 17 (Figs. 1–3). The two wedges are secured on arm 27 by means of traverse 30. In the extreme right position of this arm shown in the drawing the thick parts of the wedges are placed between the clasps and part of the side of the shuttle bearing and in this position the clasps are extended. Spring 31 tends to draw arm 27 in Fig. 3 to the left. This arm is secured on rod 32 supported by and pivoting in bearings 26. This rod carries close to its rear end arm 33 (Figs. 4 and 18), with which joint 34 forms contact, this joint being connected to one end of joint lever 36, resting on support 35. The other end of this joint lever carries roll 37, which forms contact with eccentric or cam 39 secured on driving shaft 38. The positions of the various parts are arranged in such a way that on turning the main shaft in the direction indicated in Fig. 4, the rising parts of the eccentric or cam will cause arm 27 in Fig. 3 to turn in the direction of the hand of a watch.

It is evident that the above mechanism and arrangement of parts may be widely varied by those skilled in this art without departing from the spirit of my invention, and therefore I do not wish to be understood as limiting said invention to the exact details of construction set forth.

What I claim is:—

1. In a machine of the class described, the combination of a bobbin carrier provided with means to hold the end of the bobbin thread stretched, a fixed shuttle holder, mechanism for feeding shuttles successively to said holder, mechanism for moving a bobbin from the carrier to and inserting same in the shuttle held by the fixed holder, means for holding the end of the bobbin during said movement, and mechanism for moving the shuttle from the fixed holder after the bobbin has been inserted therein.

2. In a machine of the class described, the combination of a bobbin carrier, a fixed shuttle holder, mechanism for feeding shuttles successively to said holder, mechanism for moving the bobbin from the carrier to the shuttle comprising a pair of grippers adapted to engage the bobbin on the carrier and retain same during its movement to the shuttle in the shuttle holder, and means for moving said grippers from the bobbin carrier to the shuttle in the shuttle holder, mechanism for then releasing the bobbin from said grippers, whereby the bobbin is inserted in the shuttle, and means for removing the shuttle from the fixed holder after the bobbin has been inserted therein.

3. In a machine of the class described, the combination of a bobbin carrier, a fixed shuttle holder, mechanism for feeding shuttles successively to said holder, mechanism for transporting a bobbin from the carrier to and inserting the same into the shuttle in the holder, thread tongs for holding the end of the thread of the bobbin during the operation of its transporting mechanism, and means for removing the shuttle from the holder after the bobbin has been inserted therein.

4. In a machine of the class described, the combination of a bobbin carrier, comprising a sheave, a plurality of blocks arranged in peripheral alinement thereon, having corresponding alined grooves cut therein, clamps on said sheave in transverse alinement with said blocks, whereby bobbins may be removably secured between the clamps and the block, corresponding notches on opposite sides of said grooves in each block for securing the ends of the bobbins across said grooves, a shuttle holder, mechanism for feeding shuttles successively to said holder, mechanism for inserting a bobbin into the shuttle held by the holder, and mechanism for removing the shuttle from the holder after the bobbin has been inserted therein.

5. In a machine of the class described, the combination of a bobbin carrier, a shuttle holder, means for feeding shuttles successively to said holder, spring compressed clamps overlapping the shuttle in the holder to secure same against displacement during the operation of feeding a bobbin thereto, wedging means for removing said clamps from their position over the shuttle in the holder during the feeding and removal of the shuttle to and from said holder, mechanism for inserting a bobbin in the shuttle and mechanism for removing the shuttle from the holder after the bobbin has been inserted therein.

In witness whereof I have hereunto set my hand in presence of two witnesses.

JAKOB LÜBER.

Witnesses:
 JOHANN FREI,
 EMIL SCHAMALDER.

---

Copies of this patent may be obtained for five cents each, by addressing the "Commissioner of Patents, Washington, D. C."